United States Patent

[11] 3,610,736

| [72] | Inventor | Eugene W. Bateman |
| | | Cincinnati, Ohio |
| [21] | Appl. No. | 864,729 |
| [22] | Filed | Oct. 8, 1969 |
| [45] | Patented | Oct. 5, 1971 |
| [73] | Assignee | K-D Lamp Division of Concord Control, Inc. |
| | | Cincinnati, Ohio |

[54] POWER-DRIVEN REAR VIEW MIRROR
1 Claim, 2 Drawing Figs.

| [52] | U.S. Cl. | 350/289, 350/307 |
| [51] | Int. Cl. | B60r 1/06, G02b 5/08 |
| [50] | Field of Search | 350/289, 307; 74/501 M |

[56] References Cited
UNITED STATES PATENTS

| 3,005,384 | 10/1961 | Baird et al. | 350/289 |
| 3,132,201 | 5/1964 | Bertell et al. | 350/289 UX |
| 3,429,639 | 2/1969 | Peters | 350/289 |

Primary Examiner—David Schonberg
Assistant Examiner—John W. Leonard
Attorney—Wood, Herron & Evans ABSTRACT: A remotely operable power-driven rear view mirror for vehicles of simple and reliable construction having a drive mechanism protectively contained entirely within the mirror casing and including a reversible electric power motor. The motor housing is secured to the inside of the mirror casing, while its motor armature is joined to a fixed shaft. The motor, when energized, carries the motor housing and the mirror to rotate about the armature and the shaft. A slip clutch is utilized to couple the armature and shaft and provides free manual adjustability and protection for the motor.

PATENTED OCT 5 1971

3,610,736

INVENTOR.
Eugene W. Bateman
BY
Wood, Herron & Evans
ATTORNEYS

POWER-DRIVEN REAR VIEW MIRROR

This invention relates to power-driven rear view mirrors. More particularly, the invention is directed to a mirror of simple and reliable construction which is remotely adjustable through an exceptionally wide angle of vision.

Remotely operable power-driven rear view mirrors have particular utility on automotive vehicles such as trucks and buses and are especially useful on large tractor trailers. Such mirrors, when used on one or both sides of a vehicle, greatly enhance the operational safety of the vehicle, especially when the vehicle is being operated in close quarters such as city traffic or is being backed into a loading dock or platform. Safety on highways is also enhanced by such mirrors by providing rear vision of adjacent lanes or along curved roadways. In such cases manually adjustable mirrors are highly impractical and for this reason several remotely operable mirrors have been proposed. However, many mirrors of the prior art have lacked sufficient angular adjustability to provide the driver with complete rear vision at all angles beyond his field of direct vision.

The power drive mirrors of the prior art possess several other practical and structural disadvantages. Many of these mirrors require special mountings and brackets for their installation. Another major drawback of prior art power-driven mirrors in the presence of excessively complex and bulky mechanisms. These mechanisms, while obviously contributing to the cost of the structure, also adversely affect the reliability of the device in direct proportion to their complexity. Furthermore, these mechanisms are frequently exposed to dirt and weather and their resulting chemical deterioration and abrasion, and they are also subject to damage through accidental impact. A failure of the power drive of such a mirror will usually render it less adequate than a standard hand-adjustable mirror because then it usually cannot be adjusted at all.

Prior art power-driven mirrors have not solved all of these problems even though a number of different structures have been employed. This failure is due in part to the fact that prior art mirror constructions have utilized the motor in a conventional way, i.e., to drive a rotor through a gear train linkage or the like causing the mirror to rotate. In many of these prior art mirrors the drive motor is positioned close to the actual pivot point of the mirror at its mounting to reduce the amount of drive linkage required. In many cases this gives greater exposure of the electric motor to damage and requires a special and more complicated mounting bracket. Furthermore, exposure of the motor and the other drive components to view poses an invitation to theft and vandalism and increases the likelihood of inadvertent damage. Some attempts to protect components from weather and to simplify the external structures provide for the mounting of the motor internal to the mirror casing, but these attempts all employ a relatively elaborate gear-train to impart motion to the mirror.

It is the principal object of the present invention to provide a power-driven mirror for vehicles giving improved performance and reliability through a simplified and economical structure. More particularly, an object of the present invention is to provide a self-contained power-driven mirror for vehicles which affords maximum protection for drive components and lends itself to compactness of installation.

The present invention is predicated upon the concept of providing a mirror drive including a motor and a gear reduction unit connected to the motor armature. The gear reduction shaft being coaxial with and secured to a stationary shaft while its motor housing is joined to the mirror casing. Thus the motor armature remains stationary when the motor is energized and the motor field and housing revolve around the armature carrying the mirror with them. More particularly, the mirror of the present invention is supported on two fixed shafts adapted to be secured to a conventional mounting bracket. The essential drive components of the mirror are contained within the mirror casing. These components include a reversible drive motor which is secured to the mirror casing and which has an armature connected to a gear reduction unit. The output shaft of the gear reduction unit is connected through a slip clutch to the fixed mounting shaft. The housing of the motor or gear reduction unit is connected to the mirror casing. All movable elements of the drive mechanism are mounted within and protected by the mirror housing. Moreover, the motor and gear reduction unit are mechanically isolated from excessive torques through the slip clutch. This clutch is adjusted to yield when excessive torque is applied to the mirror through impact to the mirror casing, or to allow for manual adjustment of the mirror, or to permit the motor to drive the mirror against mechanical stops employed to limit the angular adjustability of the mirror.

One of the principal advantages of the present invention is in its economy and simplicity; for example, a commercially available power drive motor having a shaft connected directly or through a gear reduction unit to the fixed shaft is sufficient for the mirror to function properly. The invention eliminates the need for a complicated gear train or for external drive components to be carried by the mounting bracket or the vehicle body. Such structure provides complete freedom of angular adjustment, but may employ mechanical stops to limit the adjustable range from excessively beyond the practical limits of rear vision.

A further advantage is that the mirror of the present invention can be easily mounted to replace a standard mirror in a conventional mounting bracket. The compactness of the mirror and freedom for exposure to view of the mechanical parts, which would easily identify the mirror as a power-driven mirror, do not so readily invite theft or vandalism.

The drive mechanism of the mirror is fully protected from damage from various sources. First, the slip clutch is mounted between the static shaft member and all drive components thereby isolating them from excessive torque. Secondly, all movable components are enclosed within the mirror housing and are thereby protected from impact, from foreign objects, or from chemical deterioration or abrasion from dirt, insects, and weather.

These and other objects and advantages of the present invention will be more readily apparent from a consideration of the following detailed description of the drawings illustrating one preferred form of a power-driven mirror embodying the principles of the present invention.

DESCRIPTION OF THE DRAWING

As shown in FIG. 1, the mirror assembly 10 includes a reflective mirror surface 11 secured to and constituting one face of a casing 12 and forming with the casing an enclosure defining a hollow interior chamber 13. The mirror housing 10 is pivotally mounted in a bracket 14 having vertically spaced upper and lower arms 15 and 16 respectively. This bracket is preferably a conventional bracket such as that commonly known as a "West Coast" bracket. In each of the arms 15 and 16 of the bracket 14 is one of two mounting holes 17 and 18 respectively. The mirror assembly 10 is pivotally mounted between spaced arms 15 and 16 of the bracket 14 on an upper shaft 19 and a lower shaft 20. The shaft sections 19 and 20 are axially aligned with each other and with the mounting holes 17 and 18 in which they are respectively inserted and rigidly secured by nuts 21 and 22 screwed on their threaded ends. The upper shaft 19 pivotally secures the casing 12 to the upper bracket arm 15 through bearing assembly 23 which is rigidly fastened to the casing 12.

Referring to FIG. 2, the lower shaft 20 extends upwardly from the bracket arm 16 through a lower bearing assembly 24 and into the hollow interior 13 of the mirror assembly 10. The housing of bearing assembly 24 is rigidly secured to the casing 12 as by means of bolts 28 and forms a pivotal connection between the casing 12 and the shaft 20. The shaft 20 is directly connected through a conventional slip clutch 25 having frictional plates 26 and 27 to the output shaft of a power drive motor 30. The clutch plates 26 and 27 frictionally engage one another and yield at some predetermined shaft torque thus limiting the torque transmitted between the shaft 20 and the motor 30, thereby protecting the drive mechanism in the event that the mirror is jammed or struck inadvertently.

Figure 1:
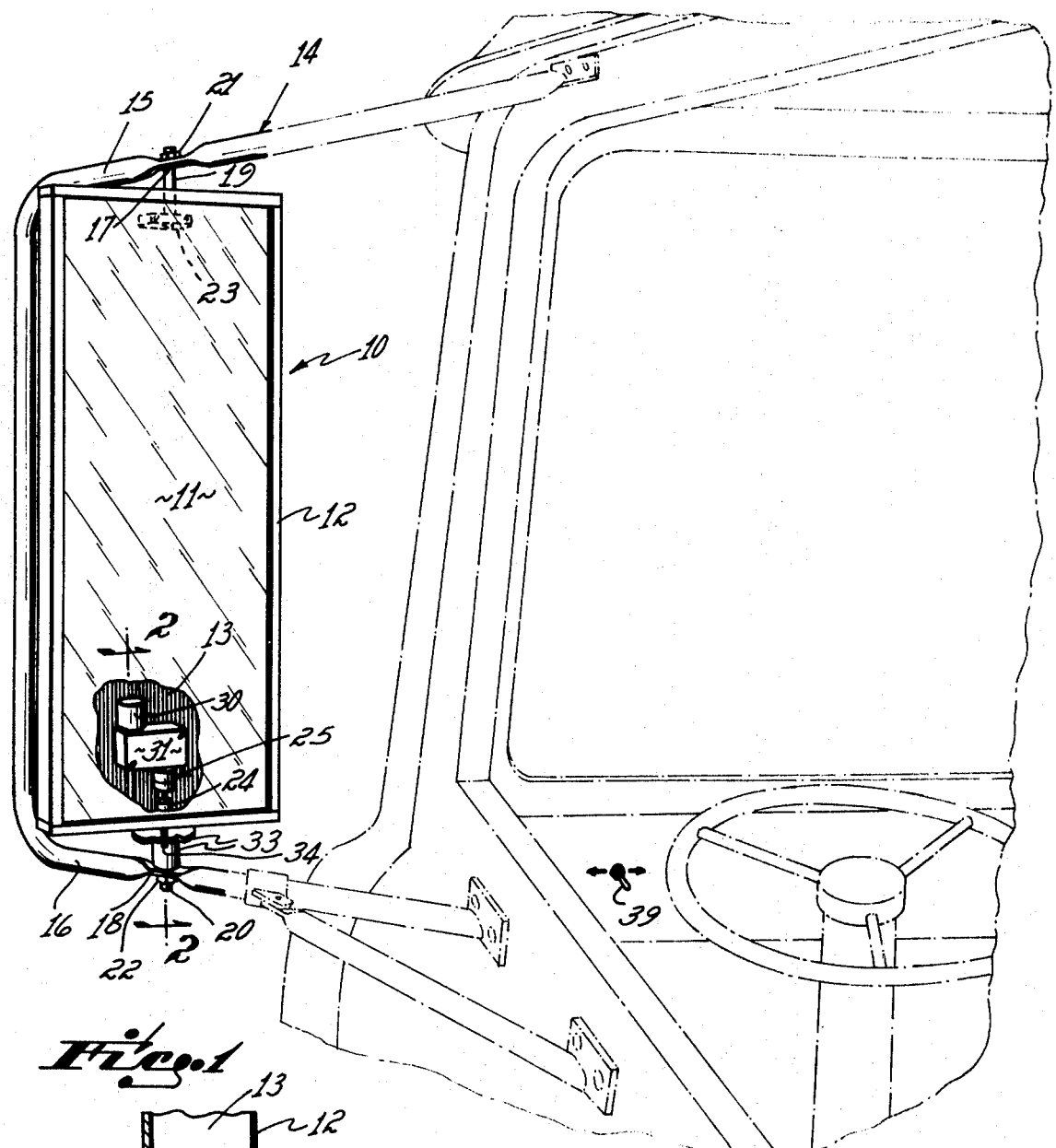
FIG. 1 is a partial cutaway perspective view of a mirror constructed according to the principles of the present invention and mounted in a conventional mounting bracket.
Figure 2:
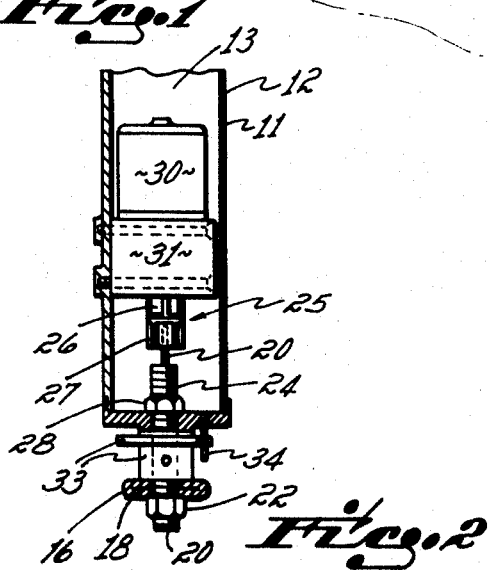
FIG. 2 is a sectional view along line 2—2 of FIG. 1 showing the drive mechanism of the mirror of the present invention.

Motor 30 is preferably a reversible DC motor capable of operating off the 12-volt electrical system of a vehicle. The motor 30 is a low-speed power drive motor which preferably includes an integral gear reduction unit 31. The housing of motor 30 is secured to the rear inside wall of casing 12 and remains stationary with respect thereto. The armature of the motor 30 is oriented parallel to the shaft 20 and is locked through the gear reduction unit 31 and clutch 25 to the shaft 20. Thus motor armature is rigidly locked in place and energizing of the motor 30 causes the motor housing, carrying the casing 12 and the mirror assembly 10, to rotate about the motor armature and thus about the shafts 19 and 20. It is clear that unless the angular motion of the mirror assembly 10 is otherwise limited, the housing of the motor 30 and the mirror assembly 10 are free to rotate in full circles about the shaft 20 thus permitting the angular adjustability of the mirror to any position over a 360° angle spanning the full field of rear vision to provide complete angular visibility to the driver of the vehicle.

Not only is the mirror automatically adjustable over the full field of desired vision but it is also manually adjustable about the same axis over the full field of desired vision by manual application of torque in excess of the limiting torque of the clutch 25.

By this arrangement it can be seen that actuation of the motor will impart a relative rotary motion between the shaft 20 and the mirror assembly 10. As shaft 20 is fixed relative to the vehicle, the mirror is reversibly rotated with respect thereto. It can be further seen that, in the absence of further constraints, the mirror is free to rotate beyond the limits of visibility and out of the field of rear vision. Thus, it is usually desirably to restrict the angular adjustability of the mirror to prevent excursions beyond the desired useful range of vision. This may be done through the use of electrical or mechanical stops. The drawings show the inclusion of such a mechanical stop plate 33 immovably secured to the shaft 20, and including a recessed segment along its periphery. The plate 33 cooperates with a stop pin 34 immovably secured in the casing 12. As best shown in FIG. 1, the cooperating stop member 33 and 34 define the limits of motion of the mirror through an arc corresponding to the peripheral recess in the plate.

It can also be seen that all of the mechanical drive components are contained and protected within the mirror casing and that no drive elements are mounted external to the mirror casing either projecting therefrom or mounted on the bracket or vehicle body. This prevents water, dirt, salt or insects from corroding or clogging the mechanism and protects the mechanism from damage through impact.

A three-position switch 39 is mounted internal to the vehicle and is wired in a conventional way to enable the operator to reversibly actuate the motor to rotate the mirror in either direction.

In operation, the driver actuates the switch 39 inside the cab to energize the motor 30 for rotating the mirror assembly 10 in the desired direction. The armature of the motor 30 is locked in position through its connection to the stationary shaft 20. Thus, when the motor 30 is energized the motor field and housing tend to rotate about the motor armature carrying with them the mirror assembly 10.

What is claimed is:

1. A remotely operable power-driven rear view mirror for mounting on a vehicle, said vehicle having a DC electrical power source and a mounting bracket with spaced upper and lower arms, said mirror comprising:

a vertically elongated hollow casing having a reflective surface mounted thereon;

a pair of coaxial pivot shafts rigidly connectable to the opposite arms of said bracket for pivotally supporting said casing between the arms of said bracket;

said pair of shafts including an idle shaft pivotally connected to said casing and a drive shaft extending into said casing;

a drive mechanism protectively contained entirely within said casing for driveably connecting said casing to said drive shaft, and said drive mechanism including a reversible DC electric motor having a housing secured to the inside of said casing, an armature, an integral gear reduction unit having parallel input and output shafts, said input shaft being connected to said armature and said output shaft being coaxial with and locked to said drive shaft, and a motor winding having a pair of leads;

a slip clutch connected in said drive shaft; and a three-way switch mounted remote from said mirror in said vehicle and connectable between said vehicle power source and the leads of said motor winding and wired to selectively connect said winding in either direction across said DC power source;

whereby said switch is selectively operable to reversibly energize said motor to rotate said motor housing about said armature and said pivot shafts to carry said mirror in rotation in either direction about said armature and said pivot shafts.